(12) United States Patent     (10) Patent No.:   US 12,663,113 B2

Law et al.     (45) Date of Patent:    Jun. 23, 2026

(54) COMPACT STAND

(71) Applicant: NOISY CLAN LTD, Glasgow (GB)

(72) Inventors: David Law, Edinburgh (GB); Jaren Faleide, Zurich (CH)

(73) Assignee: NOISY CLAN LTD, Glasgow (GB)

( * ) Notice: Subject to any disclaimer, the term of this patent is extended or adjusted under 35 U.S.C. 154(b) by 0 days.

(21) Appl. No.: 18/254,747

(22) PCT Filed: Nov. 29, 2021

(86) PCT No.: PCT/EP2021/083407

§ 371 (c)(1),
(2) Date: May 26, 2023

(87) PCT Pub. No.: WO2022/112569

PCT Pub. Date: Jun. 2, 2022

(65) Prior Publication Data

US 2024/0301990 A1     Sep. 12, 2024

(30) Foreign Application Priority Data

Nov. 27, 2020    (GB) ...................................... 2018702

(51) Int. Cl.
*F16M 11/16*      (2006.01)
*A47B 19/00*      (2006.01)

(52) U.S. Cl.
CPC ........... *F16M 11/16* (2013.01); *A47B 19/002* (2013.01); *A47B 2019/004* (2013.01); *A47B 2220/11* (2013.01)

(58) Field of Classification Search
CPC ...... F16M 11/16; F16M 11/32; A47B 19/002; A47B 2019/004; A47B 2220/11; A47B 19/10; A47B 2091/007

(Continued)

(56) References Cited

U.S. PATENT DOCUMENTS 2,481,264 A * 9/1949 Tulowiecki .......... A47B 19/002
                                             248/461
5,037,057 A * 8/1991 Andrews .............. A47B 19/002
                                             248/448

(Continued)

FOREIGN PATENT DOCUMENTS

CN      108523418 A     9/2018
KR      200437092 Y1    11/2007

OTHER PUBLICATIONS

European Patent Office, International Search Report and The Written Opinion of the International Searching Authority, May 20, 2022, 19 pages.

*Primary Examiner* — Muhammad Ijaz

(74) *Attorney, Agent, or Firm* — Perkins IP Law Group LLC; Jefferson Perkins

(57)           ABSTRACT

Compact Stand A stand (100) for holding media, such as sheet music, is configured to move from a closed configuration to an open configuration. The stand comprises a central body portion (111), a first cover portion (112) and a first leg (120). The first cover portion (112) is moveably attached to the central body portion (111) and is moveable between a first position and a second position. In the first position the first cover portion (112) overlays the central body portion (111) and in the second position the first cover portion (112) forms a substantially continuous rack with the central body portion (111) for holding media. The first leg (120) is attached to the central body portion (111) and the central body portion (111) is shaped to define a cavity and is configured to receive the first leg, such that in the closed configuration the first leg (120) is substantially enclosed within the cavity. A telescopic leg (120) for the stand is also described.

18 Claims, 12 Drawing Sheets

(58) Field of Classification Search

USPC ................................................. 248/460–464

See application file for complete search history.

(56)                        References Cited

U.S. PATENT DOCUMENTS

| | | | | |
|---|---|---|---|---|
| 5,337,996 A * | 8/1994 | Kalish | .................... | A47B 97/04 |
| | | | | 248/448 |
| 5,713,553 A * | 2/1998 | Cooper | ................. | A47B 19/08 |
| | | | | 248/188.7 |
| 6,293,511 B1 * | 9/2001 | Shepherd | ............. | A47B 19/002 |
| | | | | 248/441.1 |
| 10,098,452 B2 * | 10/2018 | Ko | ......................... | F16M 11/38 |
| 2010/0193656 A1 * | 8/2010 | Wilkenfeld | .......... | F16M 11/041 |
| | | | | 248/440.1 |
| 2015/0115125 A1 * | 4/2015 | Hou | ..................... | A47B 23/043 |
| | | | | 248/454 |
| 2016/0008070 A1 * | 1/2016 | Choudhury | .............. | A47B 9/20 |
| | | | | 108/106 |

* cited by examiner

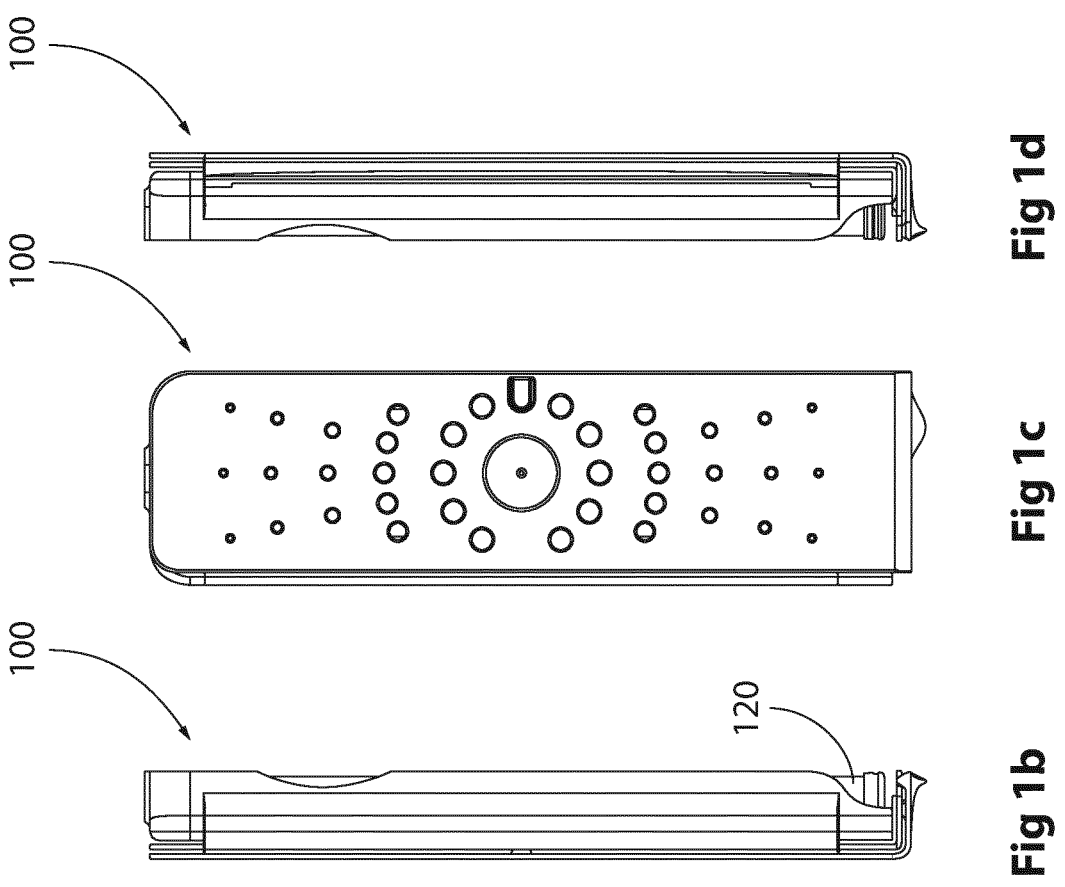
Fig 1d
Fig 1c
Fig 1b
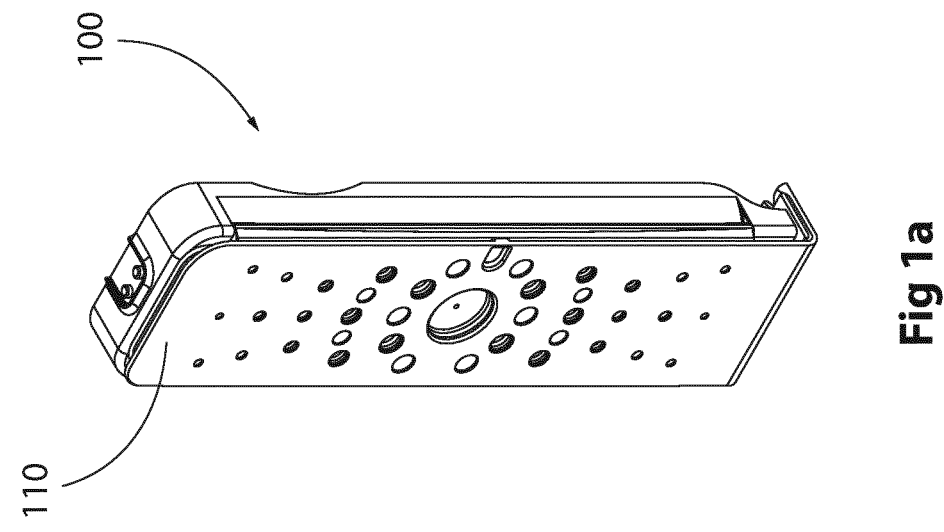
Fig 1a

121a

126a

120a 121a
121a'
122a
123a
124a
125a
126a

120a

113

110

120

130

120

COMPACT STAND

FIELD

The present invention relates to the field of stands. Particularly, the invention relates to music stands for holding sheet music, books or tablets when rehearsing or performing music.

BACKGROUND

Stands for holding paper, books or tablets have been used for many years and are useful for various types of performances such as speeches and the performance of music. Such stands provide an elevated rack where the media to be read can be positioned.

Portable and foldable stands are known and are used in musical rehearsals and live performances. Conventional music stands typically comprise a telescopically extendable leg centred in a tripod base, wherein the tripod base is collapsible around the bottom of the leg. At the top of the leg there is usually a foldable rack made of sheet metal bars to form a support for the media to be positioned thereon. The foldable rack is typically joined to the top of the leg by a hinge to allow the rack to collapse to beside the leg and tripod when folded for transport or storage. To erect the stand for use, the user must expand the tripod, raise the telescopically extendable leg and unfold the rack such that the rack can hold the paper, book or tablet for use. To collapse the stand, the user must fold the rack, collapse the telescopic leg and collapse the tripod, then collapse the folded rack to bring the rack to beside the leg and tripod as previously described.

The process of erecting and collapsing the stand for use is time consuming and is particularly complicated for children. Furthermore, the stand has many parts within which fingers may become trapped when collapsing or folding parts of the stand. It is also not advisable to put a regular folded music stand in a case with delicate instruments, as such stands comprise various hard metal parts which stick out from the folded stand and which can easily damage a delicate instrument. Often, if such stands are put in the same case as the instrument then the stand is placed in a soft pouch or sleeve. Such pouches and sleeves add additional volume and weight to the folded stand and are also easily lost when removed from the stand. It is therefore most common for the musician to carry the stand separately from the instrument.

Foldable stands of the type described are still of relatively large volume when folded, and so are awkward to carry and transport. Furthermore, said stands can easily unfold themselves causing inconvenience for the user. Said stands are also heavy and so are awkward to carry and transport.

Additionally, some users prefer to use a stand when seated at a table and then perform standing in other circumstances, such as when performing in front of an audience. In such a situation, the traditional stand may not be usable at the preferred desk because the minimum height to which the stand can be adjusted is restricted by the tripod legs, particularly when there is not enough space on the table to fully open the tripod legs.

Conventional music stands are typically placed in a backpack or bag for transport, because of their large size when folded/collapsed. Users therefore have to carry their instrument and music stand separately, which is inconvenient particularly if public transport is being used.

In schools, concert halls and recording studios where many stands are used, the stands are often stacked in a pile.

The irregular shape of folded traditional stands combined with their tendency to partially unfold of their own accord makes them particularly awkward to stack, and the pile can often become disordered and dangerous.

It is an object of the present invention to overcome at least some of the aforementioned problems with music stands.

SUMMARY

According to a first aspect of the invention there is provided a stand for holding media, wherein the stand is configured to move from a closed configuration to an open configuration and wherein the stand comprises: a central body portion; a first cover portion; and a first leg. The first cover portion is moveably attached to the central body portion and the first cover portion is moveable between a first position and a second position, wherein in the first position the first cover portion overlays the central body portion and in the second position the first cover portion forms a substantially continuous rack with the central body portion for holding media. The first leg is attached to the central body portion and the central body portion is shaped to define a cavity and is configured to receive the first leg, such that in the closed configuration the first leg is substantially enclosed within the cavity. This provides a stand which is easy to move to the open configuration and is simply constructed without parts which can trap fingers. Furthermore, the stand does not have parts which protrude from the stand when in the closed configuration, so the stand can be placed in a musical instrument bag without damaging the instrument. The stand has a small volume which is advantageous. The stand can be carried in a backpack or music bag easily, and can be stacked if desired.

The first cover portion may be hingedly attached to the central body portion. Alternatively, the first cover portion may be slidably attached to the central body portion. These methods of moveable attachment provide easy to manufacture attachment means and methods which are easy and simple for the user to use to move the stand from the closed configuration to the open configuration and vice versa. Furthermore, they allow the stand to be compacted by allowing parts of the stand to overlay, thus reducing the volume of the stand and making it compact.

The first leg may be hingedly attached to the central body portion. This allows the first leg to be moved to a position where it can support the weight of the stand whilst stopping the stand from falling over.

In the closed configuration the first leg may be fully enclosed within the cavity. This is advantageous as a leg protruding from the stand can damage instruments if the stand is placed in a case or bag with an instrument. Furthermore, enclosure of the first leg within the cavity provides a compact stand which is easy to carry and transport.

The central body portion may be substantially a cuboid. This provides a rigid shape to give strength and rigidity to the stand.

The cavity may be formed by a substantially hollow section within the central body portion. This provides a place for the leg or legs to be enclosed in the stand in the closed configuration, allowing for a compact stand.

The central body portion may comprise a planar portion and a wall, wherein the planar portion defines a front side for resting media thereon and a back side, wherein the wall may extend from the back side around a section of the perimeter of the planar portion. The wall may be substantially continuous around a section of the perimeter of the planar portion. The section of the perimeter may be at least a first side and a second side of the perimeter of the planar portion. The section of the perimeter may be substantially three sides of the perimeter of the planar portion. The wall may define a first opening and a second opening. This provides a simple construction which allows the leg or legs to be enclosed within the central body portion in the closed configuration, providing a compact stand.

The first opening may be configured to allow access to the first leg in the closed configuration. This provides the advantage of allowing the user to access the first leg so that the first leg can be moved to stand the stand upright for holding media.

The second opening may be configured to allow the first leg to telescope when the first cover portion is moved from the closed configuration to the open configuration. This allows the automatic telescoping of the first leg, which reduces the number of steps required to move the stand from the closed configuration to the open configuration. Furthermore, the automatic telescoping ensures that the stand moves from the closed configuration to the open configuration quickly when desired by the user.

The stand may further comprise a second cover portion moveably attached to the central body portion and arranged to overlay the central body portion in the closed configuration and to form a substantially continuous rack with the central body portion and the first cover portion for holding media in the open position. This provides an extended surface for holding media thereon, and thus allows larger media or multiple pieces of media to be held on the stand. Furthermore, the larger rack allows media to be held more securely on the stand.

The second cover portion may be hingedly attached to the central body portion. The second cover portion may be slidably attached to the central body portion. These methods of moveable attachment provide easy to manufacture attachment means and methods which are easy and simple for the user to use to move the stand from the closed configuration to the open configuration and vice versa. Furthermore, they allow the stand to be compacted by allowing parts of the stand to overlay, thus reducing the volume of the stand and making it compact.

The first cover portion may be arranged to overlay the second cover portion in the closed configuration. Alternatively, the second cover portion may be arranged to overlay the first cover portion in the closed configuration. This allows a compact stand to be provided which is advantageous for the user as it is easier to store and transport a compact stand.

The first cover portion may comprise a first retaining means and the second cover portion may comprise a corresponding retaining means, wherein the first retaining means and the corresponding retaining means are registered such that in the closed configuration the first retaining means and corresponding retaining means securely engage to hold the stand in the closed configuration. This stops the stand from inadvertently opening when the stand is being transported or stored, thus the stand is safer and is unlikely to damage instruments if placed in an instrument case or instrument bag.

The first retaining means may be a detent and the corresponding retaining means may be a notch. This provides retaining mean which are easy to manufacture and easy for the user to operate. The first cover portion may be sufficiently resilient such that the detent can be removed from the notch by the user. This allows the stand to be secured and unsecured without requiring any tools or additional equipment. The first cover portion may further comprise a gripping portion configured to be gripped by a user. This allows the user to easily grip the first cover portion when the user intends to move the detent.

Alternatively, the first retaining means may be a notch and the corresponding retaining means may be a detent. This provides retaining mean which are easy to manufacture and easy for the user to operate. The second cover portion may be sufficiently resilient such that the detent can be removed from the notch by the user. This allows the stand to be secured and unsecured without requiring any tools or additional equipment. The second cover portion may further comprise a gripping portion configured to be gripped by a user. This allows the user to easily grip the second cover portion when the user intends to move the detent.

The first cover portion may comprise a first ledge, and the second cover portion may comprise a second ledge, wherein the first and second ledges are arranged to support media on the stand in the open configuration, and at least one of the first and second ledges may be configured to arrest telescoping of the first leg in the closed configuration. This allows media to be positioned on the stand to be read by the user. Furthermore, this allows telescoping to be arrested such that the first leg does not inadvertently telescope when the stand is in the closed configuration, thus making the stand safer to use and transport, and less likely to damage instruments if the stand is placed in an instrument case or bag with an instrument.

The first cover portion may comprise a first clip configured to secure media to the first cover portion. The second cover portion may comprise a second clip configured to secure media to the second cover portion. The first and second clips may be registered such that together the first and second clips are configured to secure media to the stand. This allows media to be secured to the stand such that it does not fall off the stand in use. This is advantageous as the user of such stands typically does not have a free hand to hold media to the stand, and it is inconvenient if such media falls from the stand when in use.

The first cover portion may comprise a first rotatable retainer, wherein the first rotatable retainer may be rotatably mounted in the first ledge and configured to be rotatable between a first position and a second position, such that in the first position a channel for securing media of a first width is formed, and in the second position a channel for securing media of a second width is formed, wherein the second width is different from the first width. This allows the stand to be used with different sizes of media, such as paper, books and tablet computers. This provides a versatile stand which can be used for many types and sizes of media.

The second cover portion may comprise a second rotatable retainer, wherein the second rotatable retainer may be rotatably mounted in the second ledge and configured to be rotatable between a third position and a fourth position, such that in the third position a channel for securing media of a first width is formed, and in the fourth position a channel for securing media of a second width is formed, wherein the second width is different from the first width. This allows the stand to be used with different sizes of media, such as paper, books and tablet computers. This provides a versatile stand which can be used for many types and sizes of media.

The central body portion may further comprise a central retaining means configured to secure a first media to the central body and to secure a second media to the central body portion. This allows two pieces of media to be secured to a single stand, which is advantageous as it avoids the need for a user to carry and assemble two separate stands to hold two pieces of media.

The central retaining means may be configured to secure the first and second media such that the first and second media are adjacent and not overlapping on the stand. This allows both pieces of media to be read/viewed at the same time. The central retaining means may be a substantially circular clip.

The first cover portion may further comprise an extension member configured to extend from the first cover portion to provide support for media. This allows larger media to be used on the stand.

The stand may further comprise a second leg, wherein the second leg may be attached to the central body portion and the central body portion may be configured to receive the second leg, such that in the closed configuration the second leg is substantially enclosed within the cavity. This provides a compact stand.

The second leg may be immovably attached to the central body portion. This allows the second leg to provide rigidity to the central body portion.

The second leg may be moveably attached to the central body portion. The second leg may be hingedly attached to the central body portion. This allows the second leg to move to stabilise the stand on a table or floor.

In the closed configuration the second leg may be fully enclosed within the cavity. This is advantageous as a leg protruding from the stand can damage instruments if the stand is placed in a case or bag with an instrument. Furthermore, enclosure of the second leg within the cavity provides a compact stand which is easy to carry and transport.

The first leg may comprise an uppermost telescopic member and a lowermost telescopic member, wherein the first leg may be configured to telescope between a collapsed configuration and a telescoped configuration, wherein in the collapsed configuration the lowermost telescopic member may be substantially fully received within the uppermost telescopic member, and in the telescoped configuration the lowermost telescopic member may extend below and depend from the uppermost telescopic member. This provides a leg which can be telescoped for use and then collapsed for compact storage or transport.

The lowermost telescopic member may depend by an engagement means when the first leg is in the telescoped configuration, wherein the engagement means is located between the uppermost telescopic member and lowermost telescopic member. This allows the lowermost telescopic member to hang from the uppermost telescopic member, and then be collapsed into the uppermost telescopic member when the first leg is moved to the collapsed configuration.

The engagement means may be a friction interference fit between the upper end of the lowermost telescopic member and the lower end of the uppermost telescopic member. This provides secure engagement of the uppermost telescopic member and the lowermost telescopic member.

The upper end of the lowermost telescopic member may have a larger diameter than the lower end of the uppermost telescopic member, such that the movement of the lowermost telescopic member is arrested when the first leg reaches the telescoped configuration. This provides engagement of the uppermost telescopic member and the lowermost telescopic member when the uppermost telescopic member is telescoped relative to the lowermost telescopic member.

The upper end of the lowermost telescopic member may comprise a first friction material and the lower end of the uppermost telescopic member may comprise a second friction material, wherein the lowermost telescopic member and uppermost telescopic member may be configured such that telescoping of the lowermost telescopic member from within the uppermost telescopic member brings the first and second friction materials into engagement to arrest the movement of the lowermost telescopic member when the first leg reaches the telescoped configuration. This provides secure engagement of the uppermost telescopic member and the lowermost telescopic member.

The first leg may comprise an uppermost telescopic member, a lowermost telescopic member, and at least one intermediate telescopic member arranged between the uppermost telescopic member and the lowermost telescopic member. This provides the advantage of a highly compact leg, as the provision of a plurality of telescopic members allows a relatively long leg to be provided in the telescoped configuration whilst maintaining a relatively short length of only the length of the uppermost telescopic member in the collapsed configuration.

The first leg may be configured to telescope between a collapsed configuration and a telescoped configuration, wherein in the collapsed configuration the lowermost telescopic member and at least one intermediate telescopic member are substantially fully received within the uppermost telescopic member. This provides a compact leg.

In telescoped configuration the lowermost telescopic member may extend below and depends from the intermediate telescopic member and the intermediate telescopic member may extend below and depend from the uppermost telescopic member.

The stand may further comprise a hinge configured to provide moveable attachment of the first leg to the central body portion, such that the first leg can be rotated out from within the cavity when the stand is moved to the open configuration. This allows the user to easily move the stand to the open configuration without the use of tools or other equipment. Furthermore, the hinged attachment means the leg cannot inadvertently become detached and lost from the rest of the stand.

The hinge may comprise a friction component and a spine, wherein the spine is immovably connected to the central body portion and the hinge is connected to the spine and the first leg. The friction component allows the hinge to retain a particular position set by the user.

The hinge may further comprise a guide track and the first leg may comprise a recess, wherein the guide track and recess are registered such that movement of the leg is restricted to the predetermined path provided by the guide track. This ensures that the user moves the leg to the correct position for the leg to bear the weight of the stand.

The guide track may be configured to angle the first leg outwards as the leg is moved from within the cavity. This allows the stand to form a tripod style base which is particularly stable.

The first leg may further comprise a foot configured to provide grip to the first leg. This provides a secure grounding upon which the stand can rest. This ensures that the stand does not slide or slip on the floor or table upon which it is placed.

The foot may comprise a central shaft and an outer rib, and wherein the central shaft is attached to the lowermost telescopic member and the outer rib is configured to engage with and releasably grip the uppermost telescopic member in the collapsed configuration. This provides the advantage of providing an easy way for the user to secure the telescopic leg such that it does not inadvertently telescope.

The central shaft may be releasably attached to the lowermost telescopic member. This allows the foot to be replaced easily if the foot becomes worn. Furthermore, this allows different feet to be used with the stand, allowing for larger or smaller feet to be used when required, or feet of a different material to provide optimum grip and traction on the surface upon which the stand is to be used.

The outer rib may comprise a rib detent of sufficiently resilient material to provide secure engagement of the outer rib with the uppermost telescopic member in the collapsed configuration. This provides the advantage of providing an easy way for the user to secure the telescopic leg such that it does not inadvertently telescope. The provision of a rib detent of sufficiently resilient material allows the user to put the outer rib into secure engagement without the use of other tools or equipment.

The stand may further comprise a second leg in accordance with the first leg. The stand may further comprise a third leg in accordance with the first leg. Any number of legs in accordance with the first leg may be provided. Three legs provides a stable tripod base, and more than three legs provides additional stability.

The legs may be arranged to provide a tripod base for the stand when the stand is in the open configuration, and wherein all of the legs are collapsible into the cavity in the central body portion. This provides a stable base for the stand which ensures that the stand is not inadvertently knocked over.

According to a second aspect of the invention there is provided a telescopic leg for a stand, the telescopic leg comprising an uppermost telescopic member and a lowermost telescopic member. The telescopic leg is configured to telescope between a collapsed configuration and a telescoped configuration, wherein in the collapsed configuration the lowermost telescopic member is substantially fully received within the uppermost telescopic member, and in the telescoped configuration the lowermost telescopic member extends below and depends from the uppermost telescopic member.

The lowermost telescopic member depends by an engagement means when the telescopic leg is in the telescoped configuration. The engagement means is located between the uppermost telescopic member and lowermost telescopic member. This provides a compact leg.

The engagement means may be a friction interference fit between the upper end of the lowermost telescopic member and the lower end of the uppermost telescopic member. This provides secure engagement of the uppermost telescopic member and the lowermost telescopic member.

The upper end of the lowermost telescopic member may have a larger diameter than the lower end of the uppermost telescopic member, such that the movement of the lowermost telescopic member is arrested when the telescopic leg reaches the telescoped configuration. This provides engagement of the uppermost telescopic member and the lowermost telescopic member when the uppermost telescopic member is telescoped relative to the lowermost telescopic member.

The upper end of the lowermost telescopic member may comprise a first friction material and the lower end of the uppermost telescopic member may comprise a second friction material, wherein the lowermost telescopic member and uppermost telescopic member are configured such that telescoping of the lowermost telescopic member from within the uppermost telescopic member brings the first and second friction materials into engagement to arrest the movement of the lowermost telescopic member when the telescopic leg reaches the telescoped configuration. This provides secure engagement of the uppermost telescopic member and the lowermost telescopic member.

According to a third aspect of the invention, there is provided a telescopic leg for a stand, the telescopic leg comprising: an uppermost telescopic member; a lowermost telescopic member; and an intermediate telescopic member located between the uppermost telescopic member and the lowermost telescopic member. The telescopic leg is configured to telescope between a collapsed configuration and a telescoped configuration, wherein in the collapsed configuration the lowermost telescopic member and intermediate telescopic members are substantially fully received within the uppermost telescopic member, and in the telescoped configuration the lowermost telescopic member extends below and depends from the intermediate telescopic member, and the intermediate telescopic member extends below and depends from the uppermost telescopic member. The lowermost telescopic member and intermediate telescopic members depend by respective engagement means when the telescopic leg is in the telescoped configuration and the respective engagement means are located between adjacent telescopic members. This provides the advantage of a highly compact leg, as the provision of a plurality of telescopic members allows a relatively long leg to be provided in the telescoped configuration whilst maintaining a relatively short length of only the length of the uppermost telescopic member in the collapsed configuration.

According to a fourth aspect of the invention, there is provided a telescopic leg for a stand, the telescopic leg comprising: an uppermost telescopic member; a lowermost telescopic member; wherein the telescopic leg is configured to telescope between a collapsed configuration and a telescoped configuration. In the collapsed configuration the uppermost telescopic member is substantially fully received within the lowermost telescopic member, and in the telescoped configuration the lowermost telescopic member extends below and depends from the uppermost telescopic member. The lowermost telescopic member depends by an engagement means when the telescopic leg is in the telescoped configuration. The engagement means is located between the uppermost telescopic member and lowermost telescopic member. This arrangement provides the advantage of keeping the centre of gravity of the stand close to the supporting surface, i.e. the floor or table, providing stability to the stand in use.

The engagement means may be a friction interference fit between the upper end of the lowermost telescopic member and the lower end of the uppermost telescopic member. This provides secure engagement of the uppermost telescopic member and the lowermost telescopic member.

The upper end of the lowermost telescopic member may have a smaller diameter than the lower end of the uppermost telescopic member, such that the movement of the uppermost telescopic member is arrested when the telescopic leg reaches the telescoped configuration. This provides engagement of the uppermost telescopic member and the lowermost telescopic member when the uppermost telescopic member is telescoped relative to the lowermost telescopic member.

The upper end of the lowermost telescopic member may comprise a first friction material and the lower end of the uppermost telescopic member may comprises a second friction material, wherein the lowermost telescopic member and uppermost telescopic member are configured such that telescoping of the uppermost telescopic member from within the lowermost telescopic member brings the first and second friction materials into engagement to arrest the movement of the uppermost telescopic member when the telescopic leg reaches the telescoped configuration. This provides secure engagement of the uppermost telescopic member and the lowermost telescopic member.

According to a fifth aspect of the invention, there is provided a telescopic leg for a stand, the telescopic leg comprising: an uppermost telescopic member; a lowermost telescopic member; and an intermediate telescopic member located between the uppermost telescopic member and the lowermost telescopic member. The telescopic leg is config- ured to telescope between a collapsed configuration and a telescoped configuration, wherein in the collapsed configu- ration the uppermost telescopic member and intermediate telescopic members are substantially fully received within the lowermost telescopic member, and in the telescoped configuration the lowermost telescopic member extends below and depends from the intermediate telescopic mem- ber, and the intermediate telescopic member extends below and depends from the uppermost telescopic member. The lowermost telescopic member and intermediate telescopic members depend by respective engagement means when the telescopic leg is in the telescoped configuration; and the respective engagement means are located between adjacent telescopic members. This provides the advantage of a highly compact leg, as the provision of a plurality of telescopic members allows a relatively long leg to be provided in the telescoped configuration whilst maintaining a relatively short length of only the length of the lowermost telescopic member in the collapsed configuration.

According to a sixth aspect of the invention, there is provided a selectively securable telescopic leg for a stand, the leg comprising: an uppermost telescopic member, and a lowermost telescopic member, wherein the telescopic leg is configured to be telescope between: a collapsed and secured configuration; a collapsed and telescopable configuration; and a telescoped configuration. In the collapsed and secured configuration the lowermost telescopic member is releasably secured to the uppermost telescopic member; in the col- lapsed and telescopable configuration the lowermost tele- scopic member is not secured to the uppermost telescopic member; and in the telescoped configuration the lowermost telescopic member extends below and depends from the uppermost telescopic member. This provides the advantage of giving the user the option of firstly securing the leg in the collapsed configuration such that the leg will not automati- cally telescope, which is useful if the user wishes to use the stand on a table. Secondly, the user can select for the leg to be in the collapsed configuration such that the leg will automatically telescope, which is useful if the user wishes the use the stand on a floor or other surface where the legs must telescope to reach the surface. In this case the legs are free to automatically telescope which is fast and convenient.

The selectively securable telescopic leg may further com- prise a foot for providing grip to the leg, the foot comprising a central shaft and an outer rib. The central shaft may be attached to the lowermost telescopic member and the outer rib may be configured to: engage with and releasably grip the uppermost telescopic member in the collapsed and secured configuration, and not engage with the uppermost telescopic member in the collapsed and telescopable con- figuration, such that the telescopic leg can be selectively secured in the collapsed configuration. This provides the advantage of providing an easy way for the user to selec- tively secure the telescopic leg such that it does not inad- vertently telescope.

The outer rib may further comprise a rib detent of sufficiently resilient material to provide secure engagement of the outer rib with the uppermost telescopic member in the collapsed and secured configuration. This provides the advantage of providing an easy way for the user to secure the telescopic leg such that it does not inadvertently telescope. The provision of a rib detent of sufficiently resilient material allows the user to put the outer rib into secure engagement without the use of other tools or equipment.

BRIEF DESCRIPTION OF THE DRAWINGS

Embodiments of the invention will now be described with reference to the following drawings, in which:

FIG. 1a shows an isometric view of a music stand in accordance with the present invention;

FIGS. 1b, 1c and 1d show side and front views of the music stand of FIG. 1a;

FIG. 2a shows a rack of the music stand of FIG. 1a;

FIGS. 2b, 2c and 2d show front, side and plan views of the rack of the music stand of FIG. 1a;

FIG. 3a shows the rack of FIG. 2a with a circular clip and rotatable retainers for holding media on the rack;

FIGS. 3b and 3c show side and front views of the rack of FIG. 3a;

FIG. 6a shows a foot of the music stand of FIG. 1a;

FIGS. 6b, 6c and 6d show side, cross-sectional and detail views, respectively, of the foot of the music stand of FIG. 1a;

FIG. 7a shows a hinge of the music stand of FIG. 1a;

FIGS. 7b, 7c and 7d show side, front and plan views of the hinge of the music stand of FIG. 1a;

FIGS. 8g and 8h show the stand of FIG. 1a being opened from the closed configuration and placed on a table for use;

FIGS. 8i and 8j show clips and a circular clip for securing media to the rack of the stand of FIG. 1a;

DETAILED DESCRIPTION OF THE DRAWINGS

FIGS. 1a-1d show a music stand 100 in accordance with the present invention. The stand 100 can be set up for use by the user moving the stand 100 from a collapsed and folded configuration to various open configurations for use which will be described. The stand 100 comprises a rack 110 and a plurality of legs 120.
Configurations The collapsed and folded configuration shown in FIGS. 1a-1d is the smallest form factor the stand 100 can adopt, and is the configuration used for storage and transport. In this configuration the stand 100 cannot be used to hold sheet music or a book or tablet, however the substantially rectangular form and slim profile allows the stand to be stacked easily. This configuration will now be referred to as the closed configuration.

The stand 100 can be put into an operable configuration by the user, whereby in the operable configuration the stand 100 stands upright and can hold sheet music, a book or a tablet to be read by the user. The operable configuration will be described in more detail later. The sheet music, book or tablet, now only referred to as the media, is held within a foldable rack 110 (shown in FIG. 2*a*) when the stand 100 is in use. The first step of moving the stand 100 from the closed configuration to an operable configuration is to open the foldable rack 110.

Foldable Rack

Figures 2A, 2B, 2C, 2D:
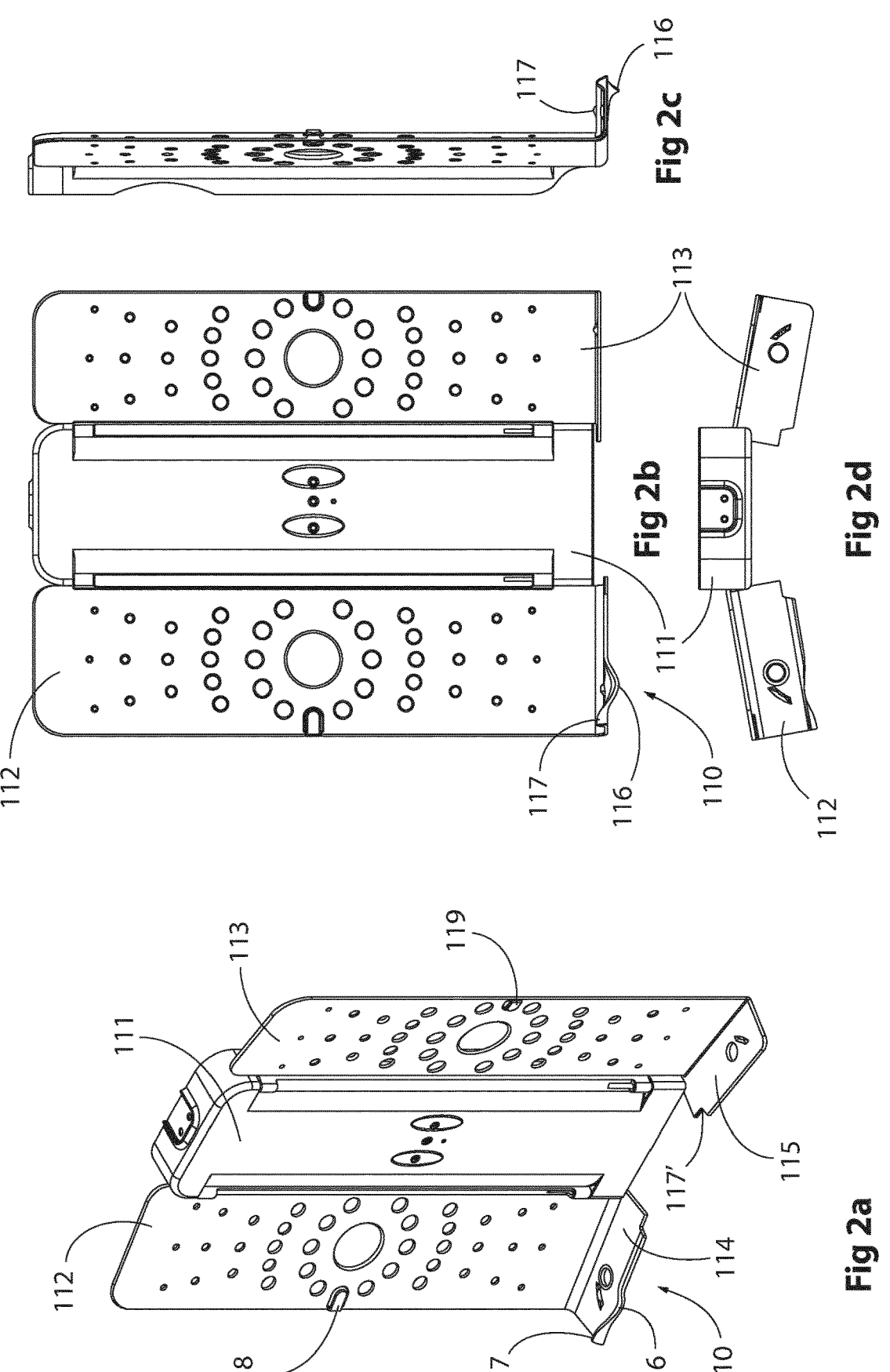

Referring to FIG. 2*a*, the rack 110 comprises a central body portion 111, a first cover portion 112 and a second cover portion 113. The central body portion 111 has an elongate substantially rectangular form with an opening (not shown in FIG. 2*a*) in the rear side and the bottom of the central body portion 111 to allow the plurality of legs 120 to be housed within the central body portion 111 in the closed configuration shown in FIG. 1*a*-1*d*. The first cover portion 112 and second cover portion 113 each comprise a plurality of apertures which help to reduce the overall weight of the stand 100. It will be understood that one continuous aperture may be present in one or both cover portions 112, 113 to provide weight reduction rather than a plurality of apertures as in the presently described embodiment.

The first cover portion 112 and second cover portion 113 are each hinged on opposite elongate edges of the central body portion 111 such that the first cover portion 112 and second cover portion 113 overlay the central body portion 111 in the closed configuration, and each of the first cover portion 112 and second cover portion 113 can be opened to form a substantially continuous surface with the central body portion 111 to rest media thereon. The first cover portion 112 and second cover portion 113 also comprise a first ledge 114 and a second ledge 115 respectively. When opened, the first and second ledges 114, 115 provide a platform for the media to rest against such that the media does not fall from the rack 110. In this regard the rack 110 also comprises a first clip 118 and a second clip 119 formed in the first cover portion 112 and the second cover portion 113 respectively. The clips 118, 119 are sized to provide a channel suitable for holding paper securely on the rack 110 when in use.

Still referring to FIG. 2*a*, the first and second ledges 114, 115 also provide the function of stopping the legs of the stand 100 from inadvertently extending while the stand 100 is in the closed configuration, and allowing the legs to automatically extend when the rack 110 is opened by opening the first and second cover portions 112, 113, as will be described in more detail later.

In the presently described embodiment in FIG. 2*a*, when opened from the closed configuration, the first cover portion 112 is first folded outwards and then the second cover portion 113 is folded outwards. The first cover portion 112 comprises a gripping projection 116 to allow the first cover portion 112 to be gripped by a finger or thumb of a user. The first cover portion 112 also comprises a detent 117 which is configured to be received in a notch 117' in the second cover portion 113 in the closed position, thus stopping the rack 110 from inadvertently opening. The first cover portion 112 is of a sufficiently resilient material such that it can be temporarily deformed to release the detent 117 from the notch 117' when the user opens the rack 110. In other embodiments the second cover portion 113 may be devoid of a notch 117' and the detent 117 may be configured to provide frictional engagement with the ledge 115 of the second cover portion 113.

The described detent 117 allows the stand 100 to be placed in an instrument bag with confidence that the stand 100 will not open and damage the instrument. These features can also be seen the alternative views provided in FIGS. 2*b*-2*d*.

Furthermore, the rack 110 may also comprise a circular clip 118' (shown in FIG. 3*a*) mounted centrally on the central body portion 111. In a similar fashion to the first clip 118 and the second clip 119, the circular clip 118' is sized to provide a channel suitable for holding paper on both sides of the rack 110, thus allowing two sheets of paper to be held on the rack 110 at once. This eliminates the need for two stands to be used side-by-side to securely display two sheets.

Figures 3A, 3B, 3C:
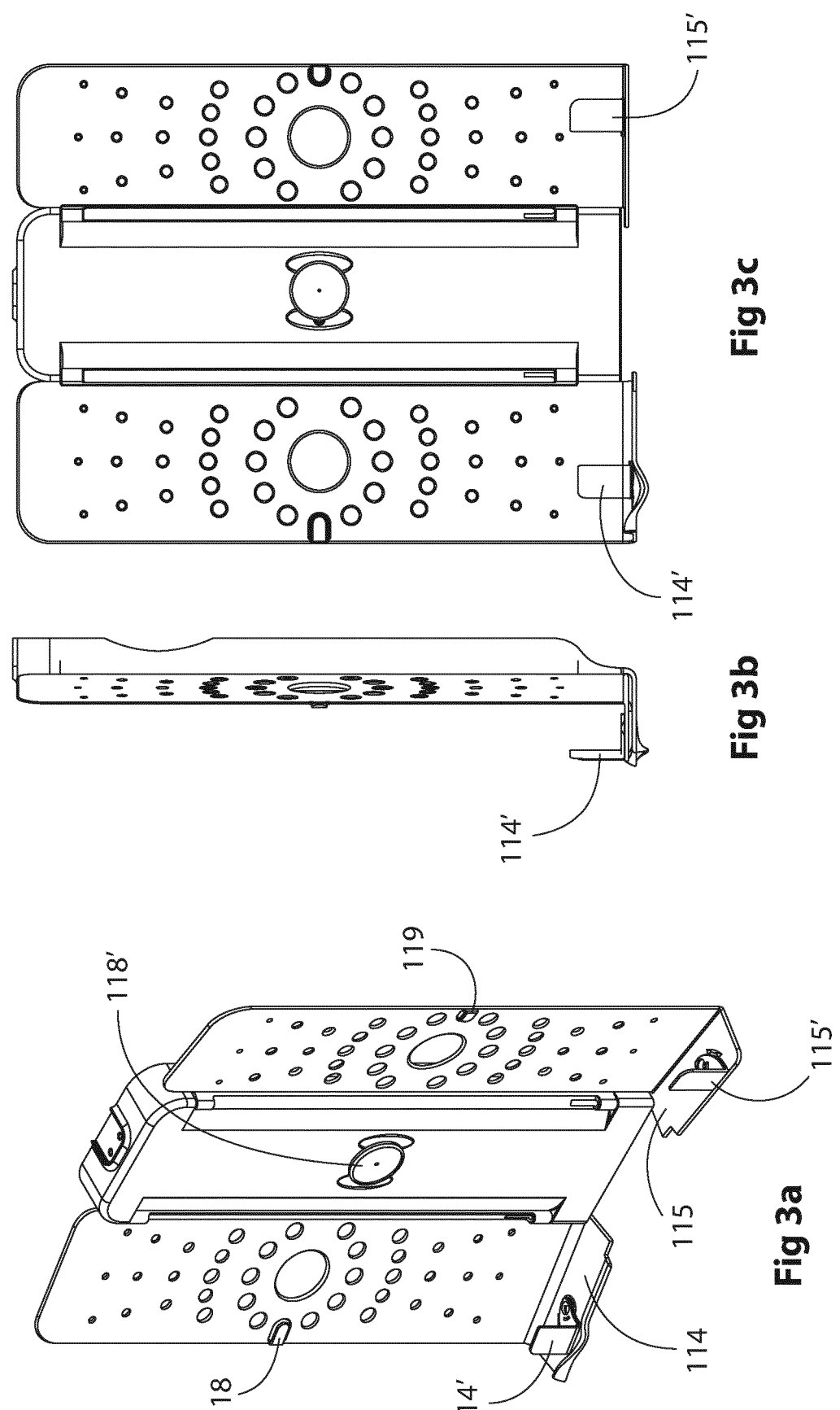

The rack 110 may also comprise a first rotatable retainer 114' and a second rotatable retainer 115' as shown in FIG. 3*a*-3*c*. The first and second rotatable retainers 114', 115' are rotatably mounted in the respective ledges 114, 115 and can be rotated around 360 degrees. In other embodiments the rotation may be limited to 180 degrees. The first and second rotatable retainers 114', 115' can, in the position shown in FIGS. 3*a*-3*c*, hold a book or tablet against the rack 110. The first and second rotatable retainers 114', 115' can be rotated 180 degrees from the position shown in FIGS. 3*a*-3*c*, in which the first and second rotatable retainers 114', 115' will then provide a similarly sized channel to that formed by the clips 118, 119, thus allowing a sheet or sheets of paper to be secured within the first and second rotatable retainers 114', 115' in this position. This allows the stand to be used for various types of media, such as, but not limited to, a sheet of paper, sheets of paper, a book, or a tablet computer. The first and second rotatable retainers 114', 115' may be releasably mounted in the respective ledges 114, 115 to allow the user to remove the first and second releasable retainers 114', 115' and replace them with other retainers of a different size or material. This allows the stand to be easily adapted by the user, thus allowing it to be used with different media for different requirements.

The rack 110 may be attachable to a folder (not shown), such as a music folder, such that the stand 100 can be easily carried by carrying a folder. To this end, the rack 110 may comprise an attachment means and a folder may comprise a corresponding attachment means registered with the attachment means of the rack 110 to allow the rack 110 to be attached and detached from the folder. In an alternative embodiment, the rack 110 may comprise a means for storing media therewithin when the rack 110 is folded closed, such as a cavity for receiving paper when the rack 110 is open, and wherein the cavity is closed and the paper is secured by the closing of the first and second cover portions 112, 113 when the rack 110 is closed. In this regard, the stand 100 also serves as a folder for media such as sheet music. This arrangement of an integral folder within the stand 100 allows the user to carry one item, i.e. a combined stand 100 and folder, rather than requiring the carrying of two separate items which is inconvenient, particularly for children or those with limited mobility or dexterity.

Legs

Referring to FIGS. 4*a*, 4*b*, 5*a* and 5*b* the legs 120 are now described with reference to a leg 120*a*. In the preferred embodiment described, three legs 120 are used, however it will be understood that in other embodiments any number of legs 120 may be used. Particularly, a stand 100 for use on a table may comprise only a single leg, wherein the single leg projects from at or near the centre of the back of the rack 110 and wherein support to allow the stand 100 to stand upright is provided by the rack 110 in combination with the single leg. The preferred embodiment with three legs 120 is now described with reference to a leg 120a.

Figures 4A, 4B:
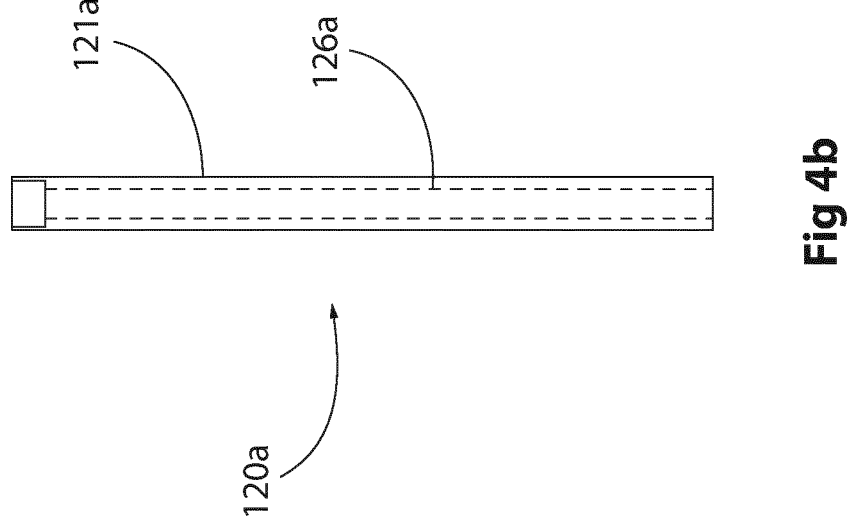
FIG. 4a shows a telescopic leg of the music stand of FIG. 1a in the telescoped configuration.
FIG. 4b shows the telescopic leg of the music stand of FIG. 1a in the collapsed configuration.

FIG. 4a shows a leg 120a comprising an uppermost telescopic member 121a and a lowermost telescopic member 126a, with first 122a, second 123a, third 124a and fourth 125a intermediate telescopic members arranged between the uppermost 121a and lowermost 126a telescopic members.

In some embodiments there may be no intermediate telescopic members, in which case the uppermost telescopic member 121a is directly telescopically connected to the lowermost telescopic member 126a. In another embodiment there may be only a first intermediate telescopic member 122a. In another embodiment there may be only a first 122a and second 123a intermediate telescopic member. In other embodiments there may be any number of intermediate telescopic members.

Still referring to FIG. 4a, the telescopic members 121a, 122a, 123a, 124a, 125a, 126a are configured such that the lowermost telescopic member 126a and all of the intermediate telescopic members 122a, 123a, 124a, 125a can telescope within the uppermost telescopic member 121a in the collapsed configuration, as shown in FIG. 4b (intermediate telescopic members 122a, 123a, 124a, 125a hidden for clarity).

The leg 120a does not comprise any tightening pins or knobs which need to be adjusted by the user. Instead, a friction fit 121a' is achieved between the lower end of the uppermost telescopic member 121a, and the upper end of the first intermediate telescopic member 122a. Similar friction fits are provided between the each of intermediate telescopic members 122a, 123a, 124a, 125a and their adjacent telescopic members 123a, 124a, 125a, 126a, respectively.

Figures 5A, 5B:
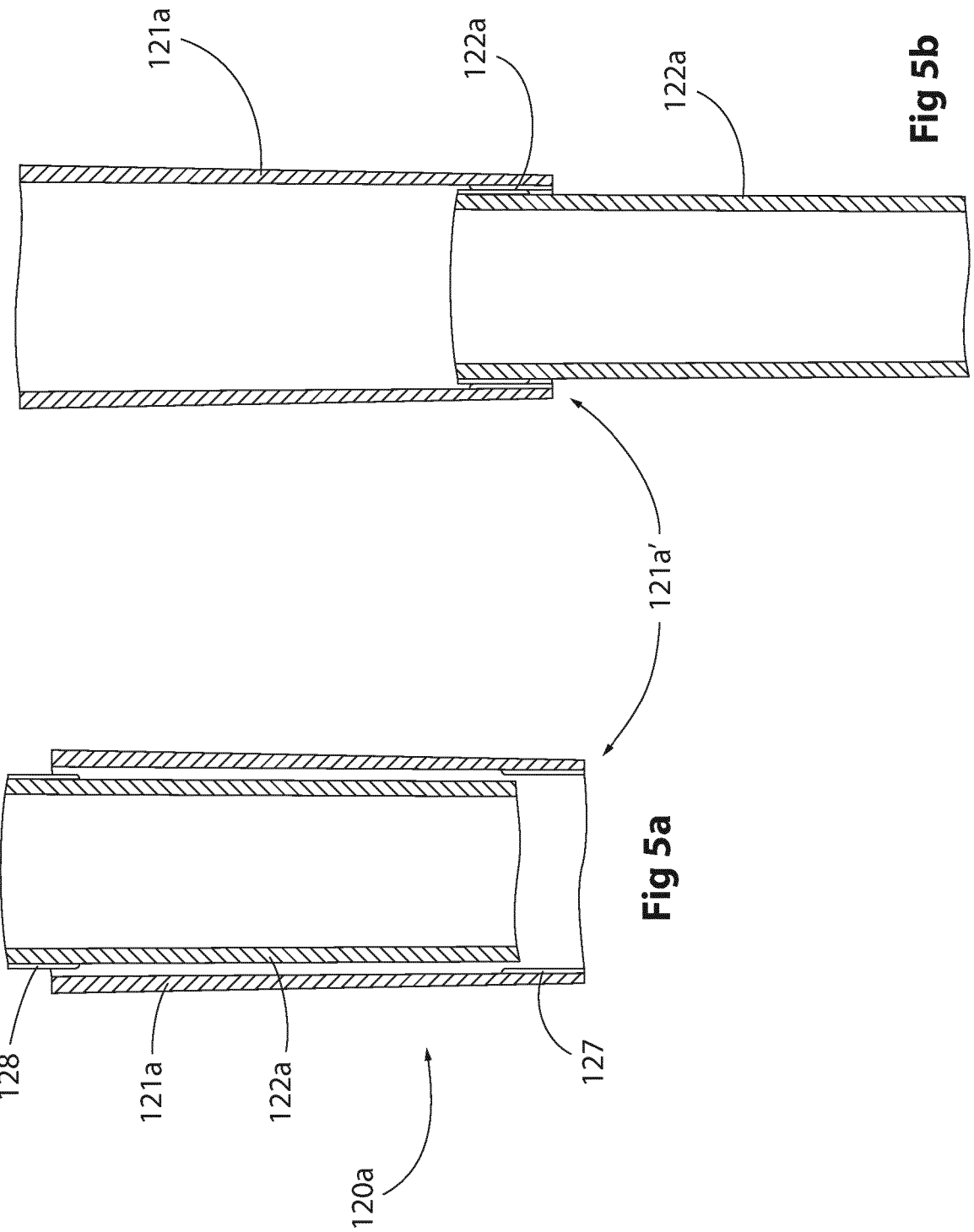
FIG. 5a shows a cross-sectional view of adjacent tele- scopic members of the telescopic leg of FIG. 4a in the collapsed configuration.
FIG. 5b shows a cross-sectional view of adjacent tele- scopic members of the telescopic leg of FIG. 4a in the telescoped configuration.

FIGS. 5a and 5b provide cross-sectional views of the friction fit 121a' between the uppermost telescopic member 121a and the first intermediate telescopic member 122a, in the collapsed configuration and telescoped configuration respectively. As shown in FIG. 5a, in the collapsed configuration the first intermediate telescopic member 122a is free to move in the longitudinal axis within the uppermost telescopic member 121a. In this regard, the lower end of the first intermediate telescopic member 122a has a smaller diameter than the lower end of the uppermost telescopic member 121a, thus allowing the first intermediate telescopic member 122a to telescope out from within the uppermost telescopic member 121a. The first intermediate telescopic member 122a is longitudinally tapered such that it has a greater diameter at its upper end with respect to the diameter at its lower end.

In some embodiments, the upper end of the first intermediate telescopic member 122a has a greater diameter than the lower end of the uppermost telescopic member 122a, thus the longitudinal telescoping is arrested as the first intermediate member 121a reaches the fully telescoped position. Alternatively, as in the embodiment shown in FIGS. 5a and 5b, the telescoping may instead be arrested by the use of a friction material 127 located on the inner surface of the lower end of the uppermost telescopic member 121a, and a corresponding second friction material 128 located on the outer surface of the upper end of the first intermediate telescopic member 122a, such that the first and second friction materials 127, 128 come together to arrest the longitudinal movement of the first intermediate telescopic member 122a when it reaches the telescoped position shown in FIG. 5b.

It will be understood that a combination of a larger diameter upper end of first intermediate telescopic member 122a than lower end of uppermost telescopic member 121a and friction materials 127, 128 may be used. Additionally, it will be understood that one friction material 127, 128 may be used on either the uppermost telescopic member 121a or the first intermediate telescopic member 122a to achieve the friction required to arrest the telescopic movement.

In an alternative embodiment, the upper end of the first intermediate telescopic member 122a comprises a pin which is biased radially outwards by a spring, and the uppermost telescopic member 121a comprises a correspondingly sized hole for receiving the pin. When the user effects telescoping of the legs 120, the pin is biased into the hole when the pin and hole align, thus arresting the telescoping of the respective telescopic members. The stand may further comprise a button for moving the pin(s) radially inwards to allow the legs to be collapsed.

In the preferred embodiment described, the uppermost telescopic member 121a houses the remaining telescopic members within it when the leg 120 is collapsed. In an alternative embodiment, the lowermost telescopic member 126a houses the remaining telescopic members within it when the leg 120 is collapsed. In this embodiment, the lowermost telescopic member 126a has a larger diameter than the remaining telescopic members, and the remaining telescopic members are arranged to telescope out from the lowermost telescopic member 126a in a reverse fashion to the preferred embodiment. In this regard, the user can either allow the lowermost telescopic member 126a to drop or pull the lowermost telescopic member 126a as above. Advantageously, providing a larger diameter lowermost telescopic member 126a allows the centre of gravity of the stand 100 to be kept close to the supporting surface, i.e. the floor or table, providing stability to the stand 100 in use.

Feet

Figures 6A, 6B, 6C, 6D:
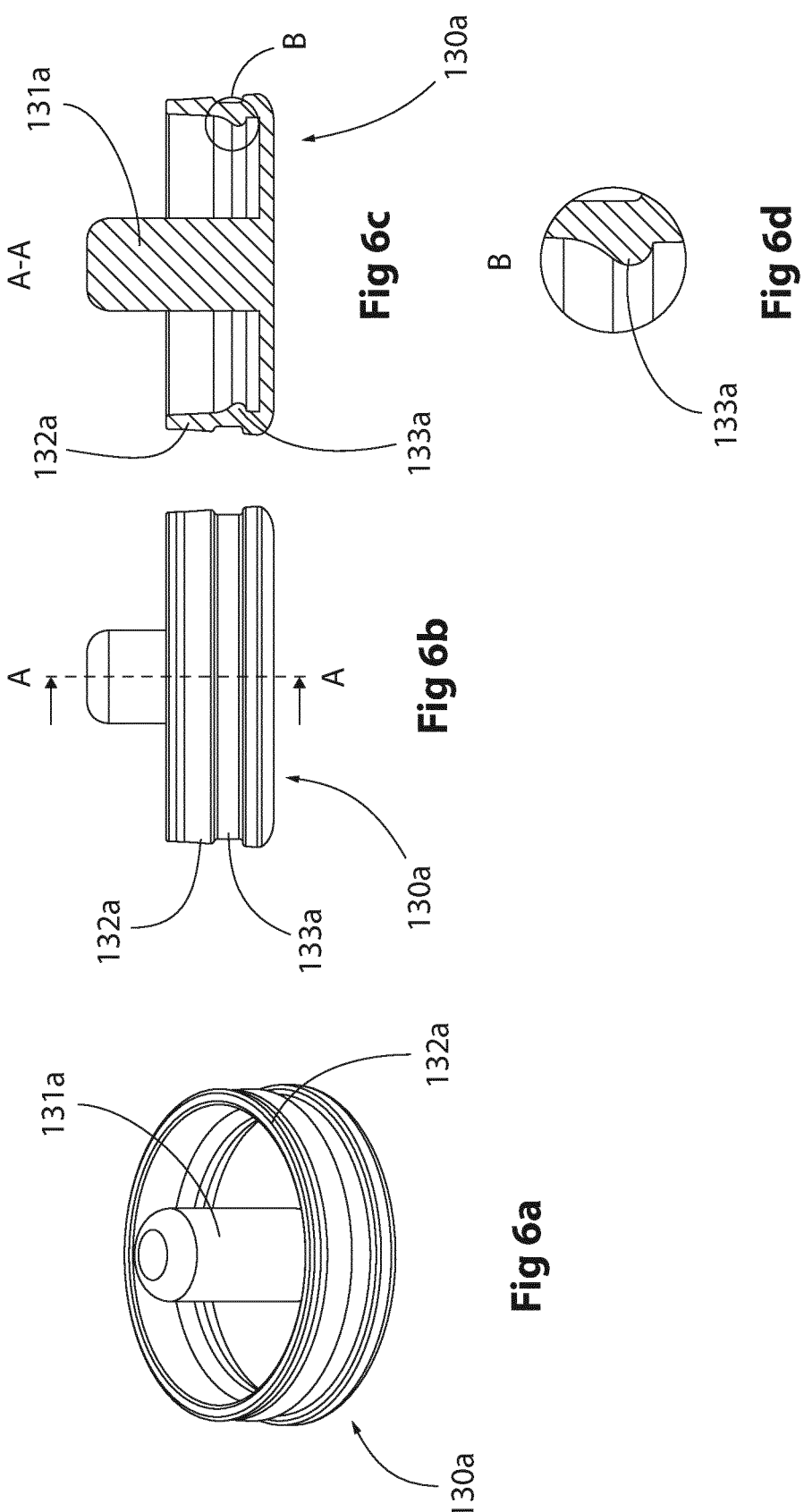
Figures 7A, 7B, 7C, 7D:
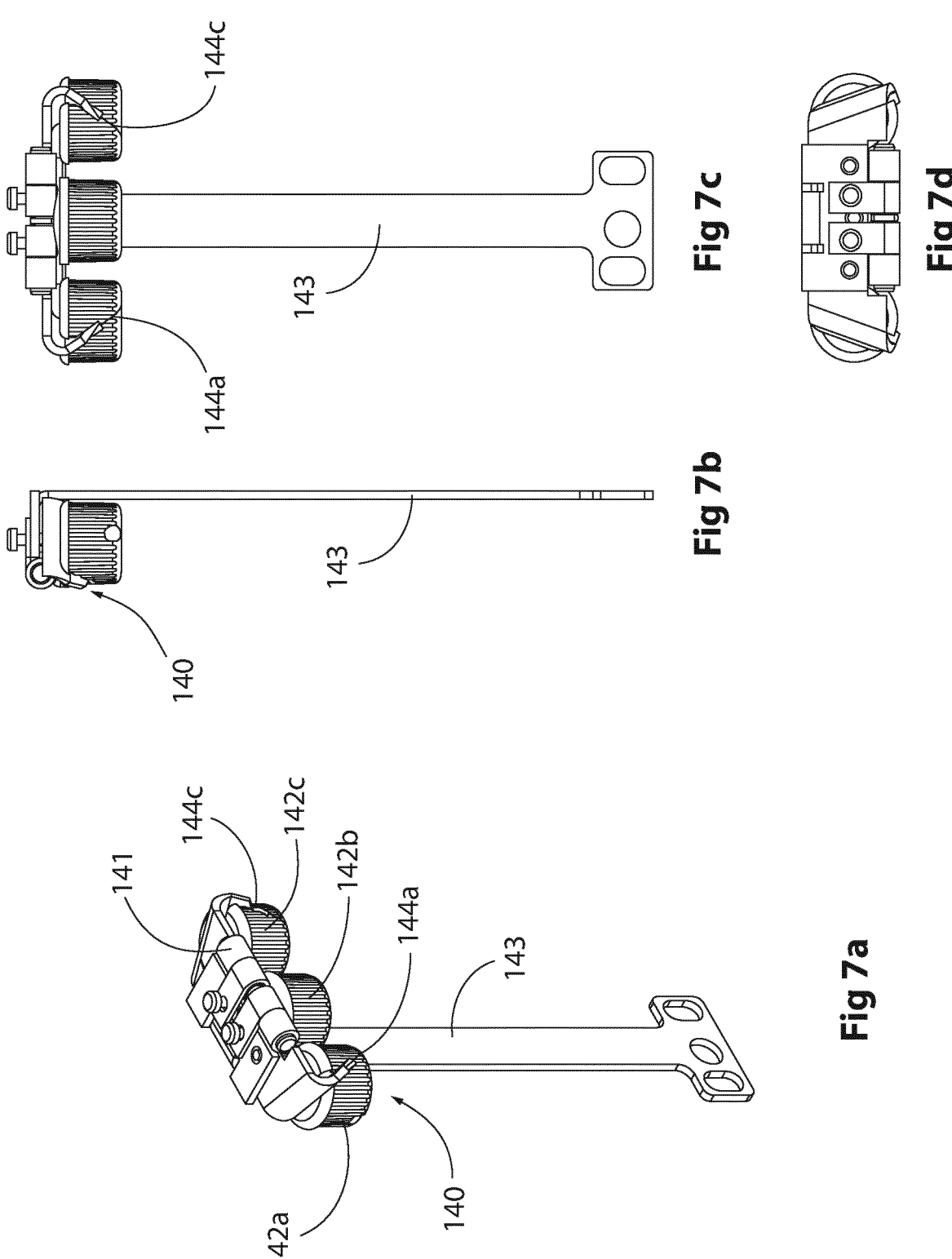

FIG. 6a shows a foot 130a which provides stability to a leg 120a as the leg 120a is positioned on a table or floor. The foot 130a comprises a central shaft 131a which is registered with the diameter of the lowermost telescopic member 126a, such that the central shaft 131a is secured to the lowermost telescopic member 126a of the telescopic leg 120a during manufacture, thus allowing the foot 130a to be telescoped to the floor when the leg 120a is telescoped.

The foot 130a may be secured to the innermost telescopic member 126a by adhesive, welding or any other means. The foot 130a may be releasably secured at the central shaft 131a to the innermost telescopic member 126a such that the foot 130a can be replaced if it becomes worn.

The foot 130a also comprises an outer rib 132a which is sized and arranged to fit securely over the lower end of the outermost telescopic member 121a of the telescopic leg 120a. As the telescopic leg 120a is telescoped inwards, the foot 130a is brought up towards the outermost telescopic member 121a. The user effects the relative movement of the rack 110 against the leg 120a to cause telescoping, either by pushing against the foot 120a with the rack 110 held securely, or by pushing against the rack 110 with the foot 120a placed on a surface such as a table or floor. If the user telescopes the leg 120a such that it is completely collapsed, the foot 130a is brought into contact with outermost telescopic member 121a of the telescopic leg 120a. The outer rib 132a of the foot 130a overlaps the lower end of the outermost telescopic member 121a of the telescopic leg 120a, and the outermost telescopic member 126a is pushed inside the outer rib 132a. The outer rib 132a comprises a rib detent 133a in the form of a smaller diameter section (with respect to the diameter of the remainder of the outer rib 132a) which engages with the lower end of the outermost telescopic member 121a by friction and thereby securely holds the foot 130a to the outermost telescopic member 121a, thereby stopping the leg 120a from telescoping under gravity. The detent 133a can be seen in the cross-sectional view shown in FIG. 6c and in the detail view in FIG. 6d.

To release the leg 120a from the secured position and allow it to telescope the user can either grip the outer rib 132a, for example with a finger or thumb, and pull in the telescoping direction, or alternatively the user can perform a flicking action to apply a force through the outer rib 132a to overcome the friction fit securing the outer rib 132a to the outermost telescopic member 121a.

Hinge

Referring now to FIGS. 7a-7d, a hinge 140 is described. The hinge 140 provides moveable attachment of the legs 120 to the rack 110 such that the legs 120 can be opened out to form a tripod style base to support the rack 110 in use.

The hinge 140 comprises a friction component 141 which connects adaptors 142a, 142b, 142c to a spine 143 of the hinge 140. The spine 143 is fixedly attached to the rack 110 (not shown). The legs 120a, 120b, 120c (not shown) are of hollow cylindrical construction such that they are each connected to a corresponding adapter 142a, 142b, 142c of the stand 100. The friction component 141 is configured to hold the rack 110 at any angle set by the user, thus allowing the user to adjust the viewing angle of the rack 110. The provision of a hinge 140 comprising a friction component 141 provides a safer stand 100, because accidental knocking of the rack 110 causes the friction component 141 to adjust the angle of the rack 110 rather than causing the stand 100 to tip over.

In the presently described embodiment using three legs 120, the hinge 140 also comprises a first guide track 144a and a second guide track 144c. The first leg 120a comprises a notch (not shown) in its upper end. The notch and first guide track 144a are registered such that movement of the first leg 120a outward from within the enclosure created by the central body portion 111 causes the first leg 120a to move out and at an angle. Since the second leg is connected to the second adaptor 142b and does not comprise a notch registered with a guide track, movement of the second leg is in one direction which is controlled by the friction component 141. The third leg connected to the third adapter 142c is guided by the second guide track 142c in a similar manner to the first leg 120a. However, the second guide track 144c is arranged to direct the third leg outwards at an angle opposite to that of the first leg 120a, thus providing a tripod style arrangement of the three legs, whilst allowing each of the legs to collapse into the enclosure formed by the central body portion 111 of the rack 110.

The described arrangement allows the legs 120 to form a substantially planar row when the legs 120 are enclosed within the central body portion 111 of the rack 110. The planar row created provides a slim profile to the stand 100, thus allowing the stand 100 to have a form factor similar to a book, folder or laptop computer. This provides a convenient shape to the stand 100 to allow it to be easily placed in a satchel, messenger bag, backpack, laptop bag or any other common carrying bag used to carry music books, sheet music or laptop computers.

Opening and Closing the Stand

As previously discussed, the stand 100 can be used in two operable configurations. Firstly, the stand 100 can be used on a table or desk with a user seated, this will be referred to herein as the tabletop configuration. The second operable configuration is with the stand 100 positioned on a floor with the user standing, this will be referred to herein as a standing configuration. The opening and closing of the stand 100 is now described with reference to FIGS. 8a-8p.

Figures 8A, 8B, 8C, 8D, 8E, 8F:
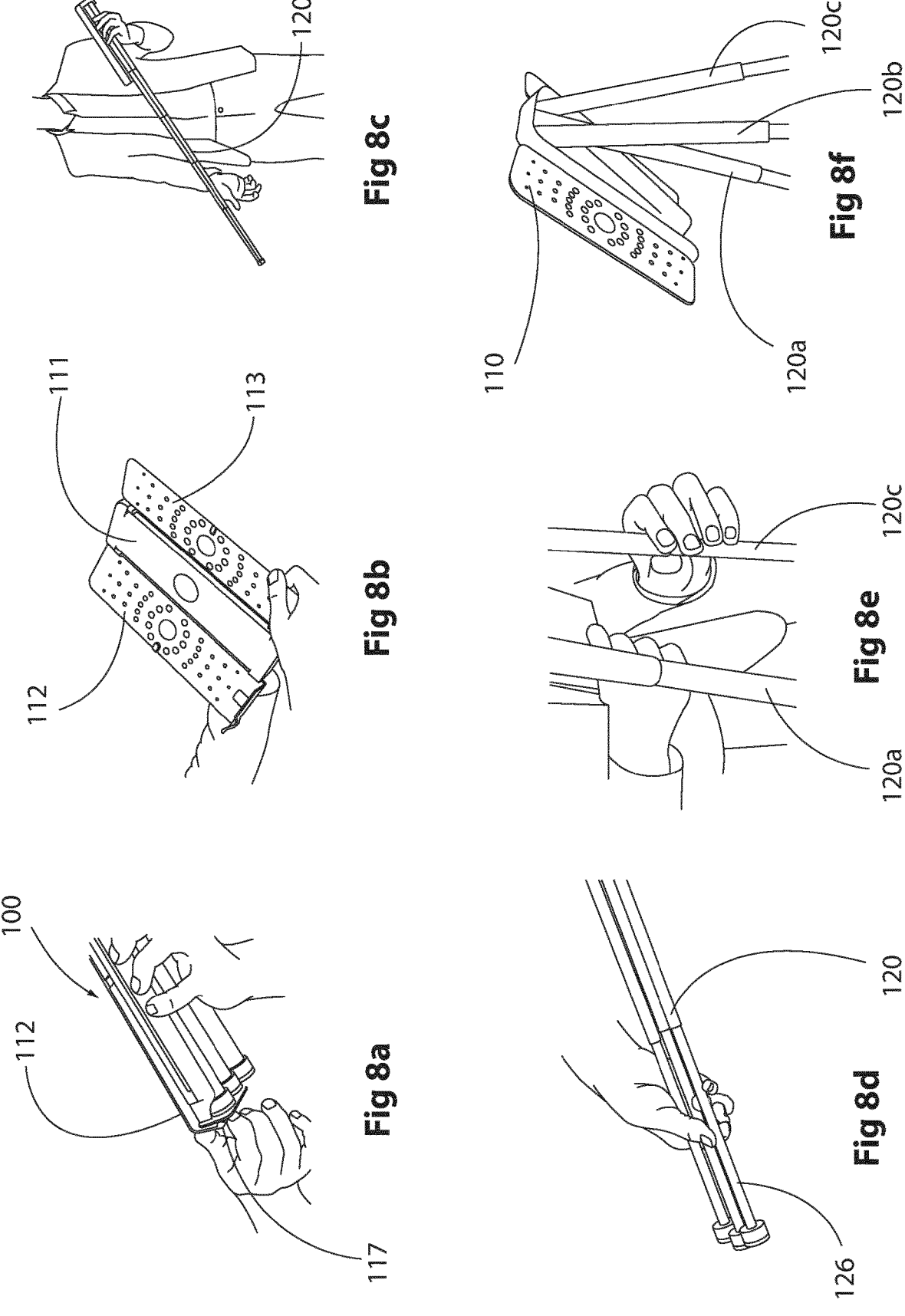
FIGS. 8a to 8f show the stand of FIG. 1a being opened from the closed configuration and placed on a floor for use.

Referring firstly to FIGS. 8a-8f, the stand 100 is arranged for use in the standing configuration. The user firstly takes the stand 100 in the closed configuration as previously described with reference to FIG. 1a, for example out of storage, a backpack or a blazer pocket. The user engages a finger with the gripping portion 116 (not visible in FIG. 8a) to move the detent 117 from engagement in the notch 117'. The user then opens the first cover portion 112 and second cover portion 113 to form a continuous surface as shown in FIG. 8b. If the user has not pushed the outer rib 132a over the uppermost telescopic member 126a, then the legs 120 will automatically begin to telescope (as shown in FIG. 8c) as the legs 120 are no longer retained once the first cover portion 112 and second cover portion 113 are opened (because the ledges 114, 115 have been moved out of the telescoping path of the legs 120). The legs 120 will then telescope until the first friction material 127 contacts the second friction material 128. Referring now to FIG. 8d, to secure the legs 120 and ensure that they can support the weight of the stand 100, the user pulls on the lowermost telescopic members 126 to transfer force through the telescopic members to ensure the telescopic members become fully telescoped and the friction materials 127, 128 between each telescopic member become fully engaged.

As shown in FIG. 8e, with the legs 120 fully telescoped, the user can now move each of the legs 120a, 120b, 120c out from within the enclosure formed by the central body portion 111, as previously described. As shown in FIG. 8f, with the legs 120 positioned on the floor, the user can adjust the viewing angle of the rack 110.

Figures 8G, 8H, 8I, 8J:
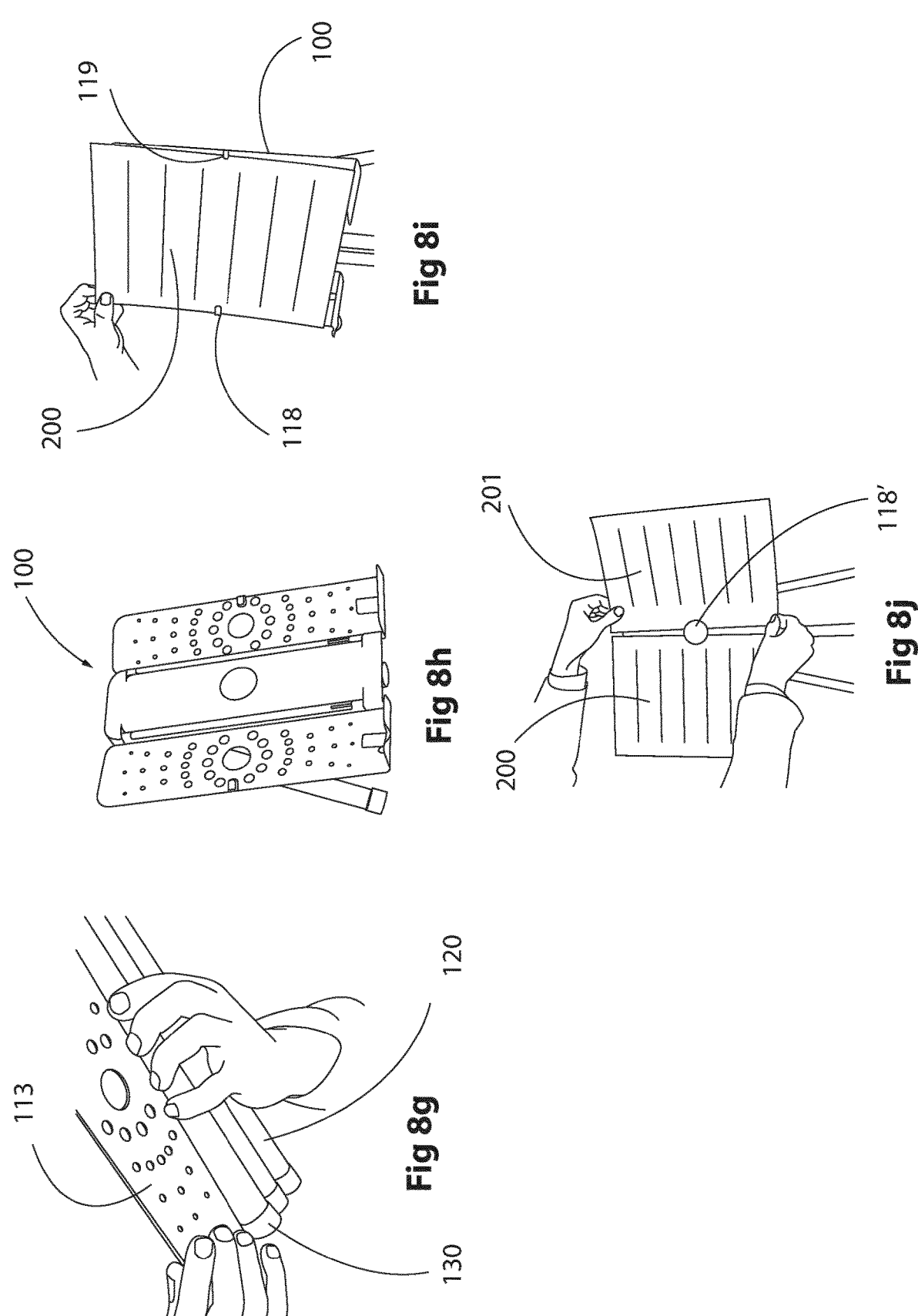

Referring now to FIGS. 8g and 8h, the stand 100 is arranged for use in the tabletop configuration. The user firstly opens the first cover portion 112 and second cover portion 113 as previously described for the standing configuration. If the user has secured the feet 130 to the legs 120 using the outer ribs 132, then the legs 120 will not automatically telescope. If the user has not secured the feet 130 to the legs 120 using the outer ribs 132, the user can catch the telescoping legs 120 and push the outer ribs 132 of the feet 130 into the uppermost telescopic members 126 of the legs 120, thus stopping the legs 120 from telescoping. The user may remove the first and third legs 120a, 120c, and leave the second leg 120b (i.e. the middle leg) attached to the central body portion 111. Alternatively, the user may remove all three legs 120 from the central body portion 111, thus allowing the angle of the rack 110 to be independently adjusted from the tripod base. The user can then place the stand 100 on a desk or table as shown in FIG. 8h.

Referring to FIGS. 8i-8m, the methods of holding media on the rack are now described. FIG. 8i shows a first piece of paper 200 held securely on the stand 100 by means of clips 118, 119. Should the user wish to place a second piece of paper 201 on the same stand 100, the user can move the first piece of paper 200 into retainment by the circular clip 118' and move the second piece of paper 201 into retainment by the circular clip 118' adjacent the first piece of paper 200, as shown in FIG. 8j.

Figures 8K, 8L, 8M:
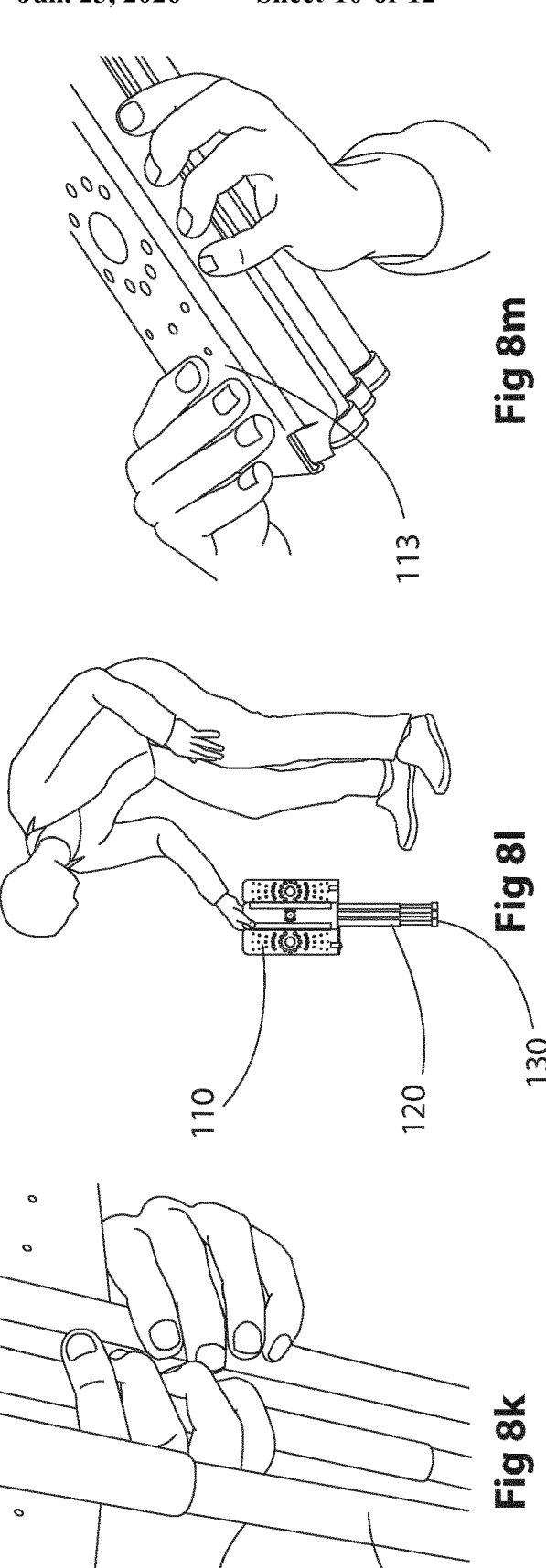
FIGS. 8k to 8m show the stand of FIG. 1a being collapsed and returned to the closed configuration for storage or transport.

Referring to FIGS. 8k-8m, the collapsing of the stand is now described. FIG. 8k shows the legs 120 being secured inside the enclosure formed by the central body portion 111. To this end, the enclosure may comprise snap fit retainers which are shaped and configured to receive and securely hold the legs 120 within the enclosure of the central body portion 111. To collapse the legs 120, the user can rest the feet 130 against a floor, as shown in FIG. 8*l*, and push the rack 110 towards the floor. Finally, the rack 110 is folded closed by the user closing the second cover portion 113 then the first cover portion 112. The stand 100 can then be placed in a musical instrument case or stacked for storage.

FIGS. 9*a*-9*d* show the stand 100 used with an optional handle strap attachment 150. As shown in the preferred embodiment in FIGS. 9*a* and 9*b*, the handle strap attachment 150 is attached to the top of the central body portion 111. It will be appreciated that in alternative embodiments the handle strap attachment 150 may be attached to alternative components of the stand 100. The handle strap attachment 150 is made of a flexible material which can be easily grasped by the user. The handle strap attachment 150 provides a means for carrying the stand 100 or attaching it to the outside of a bag or musical instrument case. The handle strap attachment 150 forms a loop for conveniently receiving the wrist of a user therein. Furthermore, the handle strap attachment 150 further comprises a separable clasp 151 which is configured to break the loop of the handle strap attachment 150 when required. Such cases where it is required to break the loop may be when the handle strap attachment 150 is placed around the wrist of a user and the stand 100 catches on an item and pulls the user's wrist, thereby endangering the user, or to allow the user to break and then reform the loop to attach the loop around another item such as the handle of a musical instrument case.

Figure 9B:
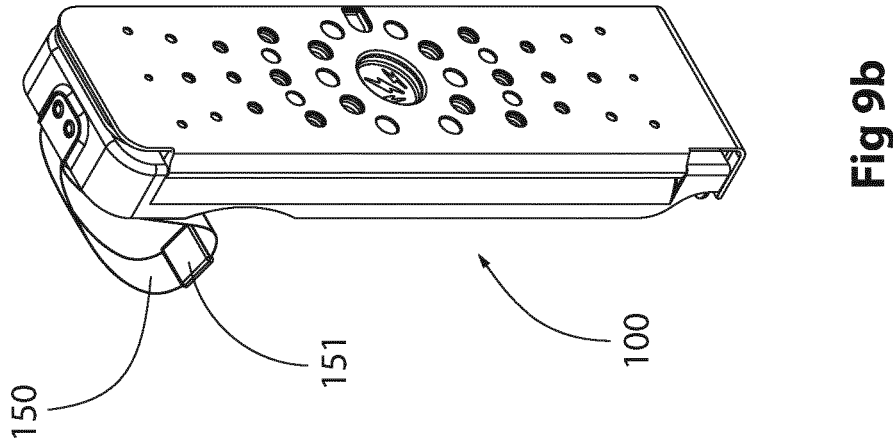
FIGS. 9a and 9b show the stand of FIG. 1a with a handle strap attachment.
Figure 9A:
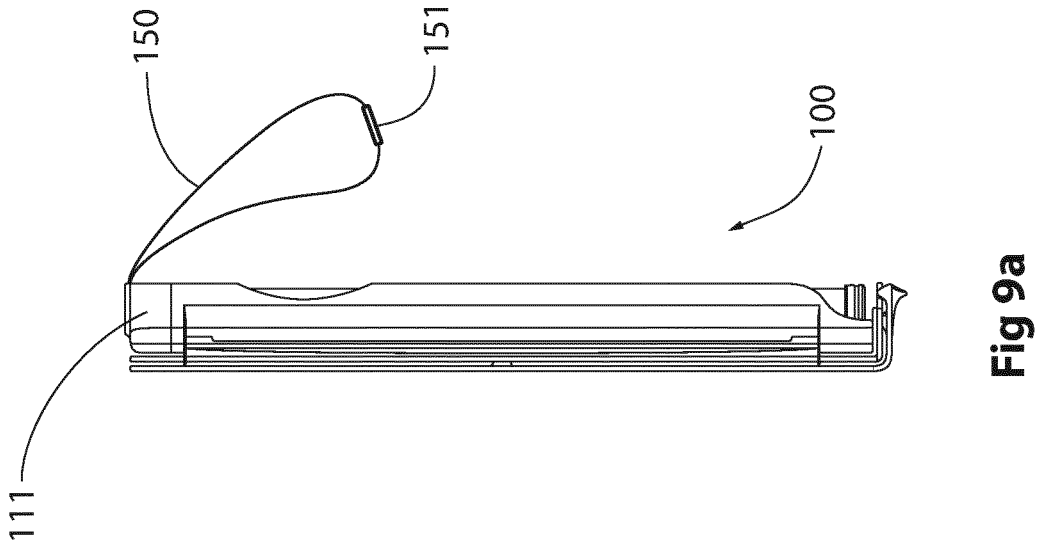
Figure 9D:
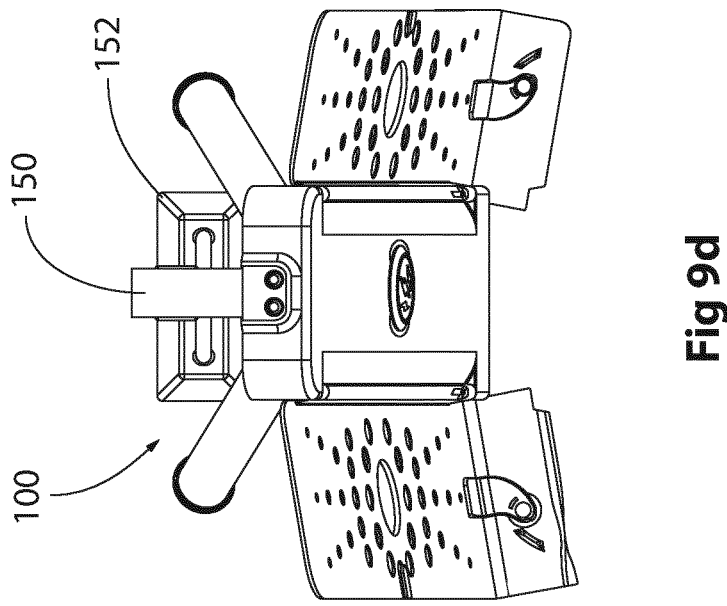
FIGS. 9c and 9d show the stand of FIG. 1b with a counter-weight attached to the handle strap attachment.
Figure 9C:
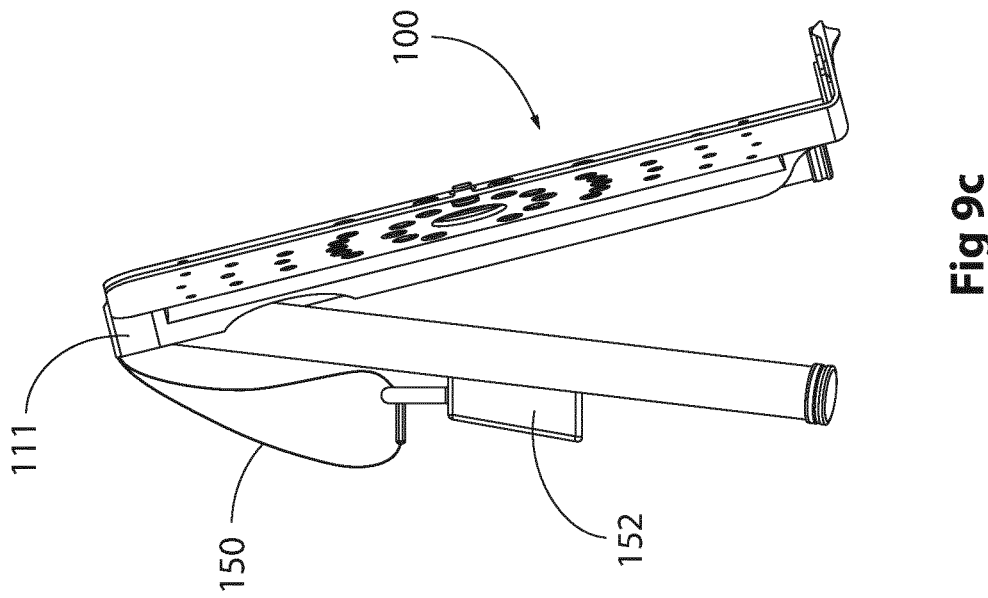

FIGS. 9*c* and 9*d* show the handle strap attachment 150 providing additional utility when the stand 100 is in use. To this end, the handle strap attachment 150 can be used to provide a point of hanging for a counter-weight 152. As shown in the side view in FIG. 9*c*, when the stand 100 is in use, most of the material of the stand 100 is around the central body portion 111, thus the weight of the stand is not centrally balanced. To move the centre of gravity, and thus improve the stability of the stand 100, the counter-weight 152 can be hung from the handle strap attachment 150 as shown in FIGS. 9*c* and 9*d*. The counter-weight 152 may take various forms. For example, the counter-weight 152 may take the form of a weighted luggage tag to allow the user to provide contact details on the tag. Alternatively, an attachment means (not shown) may be provided to allow the user to use a mobile phone, wallet or other commonly carried item as the counter-weight 152. The provision of a counter-weight 152 improves the stability of the stand 100 and ensures that the stand 100 is not easily knocked over or blown over by the wind.

The invention claimed is:

1. A stand for holding media, wherein the stand is configured to move from a closed configuration to an open configuration and wherein the stand comprises:

a central body portion;
at least one cover portion;
and at least one leg;
the at least one cover portion is moveably attached to the central body portion and the at least one cover portion is moveable between a first position being the closed configuration and a second position being the open configuration, wherein in the first position the at least one cover portion overlays the central body portion and in the second position the at least one cover portion forms a substantially continuous rack with the central body portion for holding media;
wherein the at least one leg is attached to the central body portion; and
wherein the central body portion is shaped to define a cavity, which is configured to receive the at least one leg, such that in the closed configuration the at least one leg is enclosed within the cavity;
wherein the at least one leg is telescopic and comprises two or more telescopic members configured to telescope the at least one leg between a collapsed configuration and an extended configuration, wherein in the collapsed configuration a lowermost telescopic member is substantially fully received within an uppermost telescopic member, and in the extended configuration the lowermost telescopic member extends relative to the uppermost telescopic member and wherein the telescopic members are longitudinally tapered having a greater diameter at an upper end with respect to the diameter at its lower end thus extension of the at least one leg is arrested as an upper end of an inner telescopic member reaches a lower end of an adjacent outer telescopic member.

2. The stand of claim 1, wherein the at least one leg is hingedly attached to the central body portion and wherein the at least one leg is fully enclosed within the cavity.

3. The stand of claim 1, comprising first and second cover portions, each being moveably attached to the central body portion and arranged to overlay the central body portion in the closed configuration and to form a substantially continuous rack for holding media in the open position, wherein the each of the first and second cover portions extend from the central body portion.

4. The stand of claim 3, wherein one of the first and second cover portions is arranged to overlay the other of the first and second cover portions in the closed configuration.

5. The stand of claim 3, wherein the first cover portion and the second cover portion comprises one of a detent and a notch, which are configured to securely engage in the closed configuration to hold the stand in the closed configuration.

6. The stand of claim 5, wherein one of the first and second cover portions is sufficiently resilient such that the detent can be removed from the notch to facilitate opening the stand.

7. The stand of claim 4, wherein the overlaying one of the first and second cover portions further comprises a gripping projection configured to be gripped by a user to aid changing the configuration of the stand from closed to open configuration.

8. The stand of claim 4, wherein the first and second cover portions each comprise a ledge wherein the ledges are arranged to support media on the stand when the stand is in the open configuration, and wherein at least one of the ledges is configured to support a bottom of the at least one leg in the closed configuration.

9. The stand of claim 4, wherein each of the first and second cover portions comprises a clip configured to secure media to the first and second cover portions and such that together the clips secure media to the stand.

10. The stand of claim 8, wherein the first and second cover portions each comprise a rotatable retainer, wherein each rotatable retainer is rotatably mounted on the ledge of the first and second cover portions, wherein each retainer is configured to be rotatable between a first position and a second position, such that in the first position a channel for securing media of a first width is formed, and in the second position a channel for securing media of a second width is formed, wherein the second width is different from the first width.

11. The stand of claim 1, wherein the central body portion further comprises a central retaining means configured to secure a first media to the central body and to secure a second media to the central body portion, wherein the central retaining means is configured to secure the first and second media such that the first and second media are adjacent and not overlapping on the stand.

12. The stand of claim 1, further comprising two or more legs, wherein the two or more legs are attached to the central body portion and the central body portion is configured to receive the two or more legs, such that in the closed configuration the two or more legs are enclosed within the cavity.

13. The stand of claim 1, further comprising friction members at one or both of the upper end of the inner telescopic member and the lower end of the adjacent outer telescopic member such that a friction interference fit between the upper end of the inner telescopic member and the lower end of the outer telescopic member arrests further extension and prevents collapsing of the at telescopic members.

14. The stand of claim 13, wherein the upper end of the inner telescopic member comprises a first friction material and the lower end of the adjacent outer telescopic member comprises a second friction material, such that extending the inner telescopic member from within the outer telescopic member brings the first and second friction materials into engagement to arrest further extension of the inner telescopic member relative to the outer telescopic member.

15. The stand of claim 1, wherein the at least one leg further comprises a foot configured to provide grip to the at least one leg, wherein the foot comprises a central shaft and an outer rib, and wherein the central shaft is releasably attached to the inner telescopic member and the outer rib is configured to engage with and releasably grip the outer telescopic member in the collapsed configuration.

16. The stand of claim 15, wherein the outer rib comprises a rib detent of resilient material, which is sufficiently resilient to provide secure engagement of the outer rib with the outer telescopic member in the collapsed configuration.

17. The stand of claim 1, comprising three legs, wherein the three legs are arranged to provide a tripod base for the stand when the stand is in the open configuration, and wherein all of three legs are collapsible into the cavity in the central body portion.

18. A stand for holding media, wherein the stand is configured to move from a closed configuration to an open configuration and wherein the stand comprises:

a central body portion;

at least one cover portion;

and at least one leg;

the at least one cover portion being moveably attached to the central body portion and the at least one cover portion being moveable between a first position that is the closed configuration and a second position that is the open configuration, wherein in the first position the at least one cover portion overlays the central body portion and in the second position the at least one cover portion forms a substantially continuous rack with the central body portion for holding media;

wherein the at least one leg is attached to the central body portion; and wherein the central body portion is shaped to define a cavity, which is configured to receive the at least one leg, such that in the closed configuration the at least one leg is enclosed within the cavity;

further comprising a hinge configured to provide moveable attachment of the at least one leg to the central body portion, such that the at least one leg can be rotated out from within the cavity when the stand is moved to the open configuration, wherein the hinge comprises a friction component and a spine, wherein the spine is immovably connected to the central body portion and the hinge is connected to the spine and the at least one leg and wherein the hinge includes a guide track and the at least one leg includes a recess, wherein the guide track and recess are registered such that movement of the leg is restricted to a predetermined path provided by the guide track and wherein the guide track is configured to angle the at least one leg outwards as the at least one leg is moved from within the cavity relative to the central portion.

*    *    *    *    *